(12) United States Patent
Bloebaum et al.

(10) Patent No.: US 6,937,865 B1
(45) Date of Patent: Aug. 30, 2005

(54) POSITION DETECTION SYSTEM INTEGRATED INTO MOBILE TERMINAL

(75) Inventors: Leland S. Bloebaum, Cary, NC (US); Havish Koorapaty, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 826 days.

(21) Appl. No.: 09/660,519

(22) Filed: Sep. 12, 2000

(51) Int. Cl.[7] ............................................... H04Q 7/20
(52) U.S. Cl. .............................. 455/456.1; 455/456.3; 455/414.2; 342/357.03; 342/357.05; 342/357.15; 701/213; 701/214; 701/215
(58) Field of Search .......................... 455/456.1–456.6, 455/414.2; 342/357.03, 357.05, 357.15, 357.06, 342/357.6; 701/213–215

(56) References Cited

U.S. PATENT DOCUMENTS

| | | | |
|---|---|---|---|
| 5,365,450 A | 11/1994 | Schuchman et al. | |
| 5,418,538 A | 5/1995 | Lau | |
| 5,841,396 A | 11/1998 | Krasner | |
| 5,889,492 A | 3/1999 | King et al. | |
| 6,058,338 A | 5/2000 | Vayanos et al. | |
| 6,252,544 B1 * | 6/2001 | Hoffberg | 342/357.1 |
| 6,313,787 B1 * | 11/2001 | King et al. | 342/357.02 |
| 6,347,281 B1 * | 2/2002 | Litzsinger et al. | 701/213 |
| 6,429,808 B1 * | 8/2002 | King et al. | 342/357.02 |
| 6,437,735 B1 | 8/2002 | McMahan | |
| 6,456,234 B1 * | 9/2002 | Johnson | 342/357.09 |
| 6,477,565 B1 * | 11/2002 | Daswani et al. | 709/217 |
| 6,654,682 B2 * | 11/2003 | Kane et al. | 701/202 |
| 6,671,620 B1 * | 12/2003 | Garin et al. | 701/213 |

FOREIGN PATENT DOCUMENTS

| | | |
|---|---|---|
| DE | 100 54 764 A | 6/2001 |
| GB | 2 347 035 A | 8/2000 |
| WO | WO 00 10028 A | 2/2000 |

* cited by examiner

Primary Examiner—Rafael Perez-Gutierrez
Assistant Examiner—Khawar Iqbal
(74) Attorney, Agent, or Firm—Coats & Bennett, P.L.L.C.

(57) ABSTRACT

A wireless communications mobile terminal conserves bandwidth by determining which position detection assisting devices within a position detection system are available for use and limiting ephemeris information inquiries to only those devices that are available. To make this determination, mobile terminals are provided with an almanac of position information relating to the position detection system. Once the ephemeris information is provided to the mobile terminal, the mobile terminal may determine its location relatively quickly and with a minimal imposition on the mobile network.

30 Claims, 6 Drawing Sheets

POSITION DETECTION SYSTEM INTEGRATED INTO MOBILE TERMINAL

BACKGROUND OF THE INVENTION

The present invention is directed to a mobile terminal integrated with a position detection system and a method to minimize traffic on a mobile network.

Mobile terminals such as cellular phones, personal digital assistants, laptops equipped with wireless modems, and the like have exploded into the public consciousness. These devices enable individuals to remain connected to other people without being tied to a land-based phone.

Because mobile terminals are in fact, by definition, mobile, many recent patents have discussed incorporating position detection capabilities into the mobile terminals so that the user may know where they are. Alternatively, such technology may be used so that a third party knows where the mobile terminal is located. One such proposed use of a position detection system is to deter theft; items being protected may periodically report their present whereabouts through a wireless modem as determined by the position detection system.

One popular position detection system targeted for such incorporation into a mobile terminal is the Global Positioning System (GPS), which relies on a constellation of satellites to assist a GPS receiver in determining its location. Other terrestrial or satellite-based systems do exist, such as GLONASS, the Russian equivalent of GPS. Likewise, position detection systems have been proposed which would use base stations in a mobile network to provide triangulation data for mobile terminals within the mobile network.

Unfortunately, while integration of position detection systems and mobile terminals seems like a laudable goal and is technically feasible, such integration may tend to ignore the realities behind such position detection systems and mobile networks.

For example, GPS has an extremely slow data transfer rate. It may take on the order of ten to twenty minutes to secure enough information from the satellites to determine position without any a priori knowledge. While GPS may be an extreme example, other positioning systems may experience similar delays. Inability to secure quick position information may lead to consumer frustration. In a theft deterrent usage, the long lag in determining a position of a stolen item may hinder recovery efforts.

Several solutions to this problem have been proposed, although presently without any significant commercial exploitation. In a first solution, "almanac" information is stored in the mobile terminal so that the mobile terminal can determine approximately where in the sky to search for satellite signals from which to determine position. In a second solution, the mobile terminal inquires over the mobile network to a server about the precise present location ("ephemeris") of the satellites.

While these solutions may assist the mobile terminal in determining where to look for satellites from the GPS, they still are not satisfactory. The first solution does not speed up the location determination process that much. Even where a complete set of almanac information is available in the mobile terminal, it may take on the order of a full minute to receive enough information from the GPS satellites to determine the precise location of the mobile terminal. The second solution creates a huge bandwidth demand on the mobile network since the ephemeris information is sent about all the satellites, not merely the ones visible. Such ephemeris could be broadcast to multiple mobile terminals over a shared control channel, or provided in individual responses to requests from mobile terminals. Since the common control channel is typically a scarce resource, clogging it with lots of ephemeris information may preclude another service. While providing ephemeris in individual responses to requests alleviates this problem, it is relatively inefficient from a network management point of view. Moreover, when the number of mobile terminals requesting ephemeris data increases, the problem of using bandwidth, another scarce resource, is not alleviated.

Thus, there is a need for a system or technique that limits reliance on information from the position detection system, whether that information be provided directly from the position detection assisting devices or from a server that has received that information from the position detection system.

BRIEF SUMMARY OF THE INVENTION

The present invention solves the problems associated with the prior art by hybridizing the solutions of the prior art. An almanac is stored in memory associated with a mobile terminal. This almanac may periodically be updated as needed. The mobile terminal initially inquires of the almanac what position detection assisting devices should be visible to the mobile terminal. The mobile terminal then requests ephemeris for only those position detection assisting devices that are theoretically visible to the mobile terminal. A server in the mobile network then provides the information about only the requested position detection assisting devices. The server need not know where the mobile terminal is located. This conserves bandwidth on the mobile network by reducing the amount of information that need be provided to the mobile terminals and at the same time reduces the time taken to compute the position of the mobile terminal.

In another embodiment, an almanac is stored in memory associated with a mobile terminal. This almanac may periodically be updated as needed. The mobile terminal initially inquires of the almanac what position detection assisting devices should be visible to the mobile terminal. After determining which position detection assisting devices should be visible, the mobile terminal attempts to receive information from the theoretically visible position detection assisting devices. The mobile terminal culls the actually visible position detection assisting devices from the theoretically visible. The mobile terminal then requests ephemeris for only those position detection assisting devices that are actually visible to the mobile terminal. A server in the mobile network then provides the information about only the requested position detection assisting devices. This provides similar advantages as that listed above and may result in even less bandwidth consumption.

In an alternate embodiment, the mobile terminal evaluates the almanac not only for the position detection assisting devices that may be visible, but also for the timeliness of the information in the almanac. If the information in the almanac is sufficiently timely, perhaps because of a recent update to the almanac about the position of the position detection assisting device, information is not requested for that position detection assisting device, but rather information is only requested for those position detection assisting devices whose information is stale and who should be visible.

In still another embodiment, even if many satellites or position detection assisting devices are visible to the mobile terminal, the mobile terminal may request ephemeris information about only a subset of the position detection assisting devices necessary and sufficient to establish position. Thus, for example, if seven satellites are visible, ephemeris information may be requested about only four.

DETAILED DESCRIPTION OF THE INVENTION

The present invention is directed to an improvement on communication between mobile terminals and a mobile network wherein the communication is used to facilitate position detection by the mobile terminal. An understanding of an entire communications system and mobile terminal may be helpful for a proper understanding of the context of the present invention. While the following discussion is couched in terms of a TIA/EIA-136 communication system, it should be appreciated that the present invention is equally applicable to Digital Advance Mobile Phone Service (D-AMPS), European Total Access Communication System (ETACS), Code Division Multiple Access (CDMA), Global System for Mobile Communication (GSM), Pacific Digital Cellular (PDC), and the like, the standards and documentation of which are herein incorporated by reference.

Figure 1:
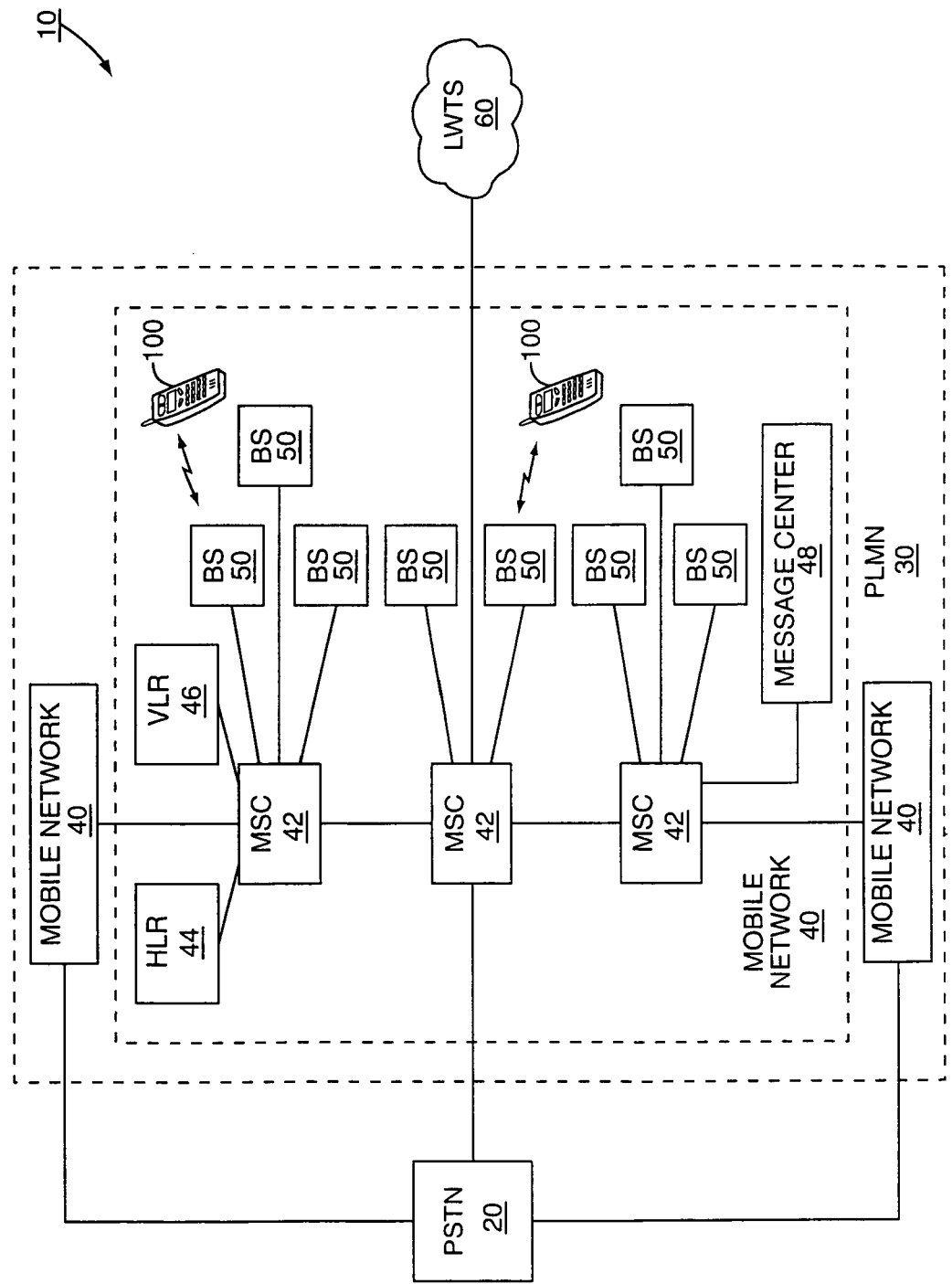
FIG. 1 illustrates a schematic drawing of a communication system suitable for use with the present invention.

Turning now to FIG. 1, a communication system 10 is illustrated. In particular, the communications system 10 includes the Public Switched Telephone Network (PSTN) 20 and the Public Land Mobile Network (PLMN) 30, which may, in turn, be connected to one or more Localized Wireless Telephone Systems (LWTS, only one shown) 60. LWTS 60 may be proprietary or public as needed or desired. While not shown, satellites may be used as needed either within the PSTN 20 or the PLMN 30 to provide remote communication links, such as across oceans or the like.

The operation of the PSTN 20 is well established and subject to extensive documentation beyond the scope of the present invention and therefore a more detailed discussion is omitted.

PLMN 30 may include a plurality of proprietary mobile networks 40, such as those operated by AT&T and BELL-SOUTH MOBILITY, also known as service providers. Each mobile network 40 may include a plurality of Mobile Switching Centers (MSCs) 42. Note that in a TIA/EIA-136 system, MSC stands for Mobile Switching Center. Equivalently, in a GSM system, MSC stands for a Mobile Services Switching Center. The acronym and the functions remain identical, however, the term for which the acronym stands is slightly different. Other systems may have yet other names, however, the general function of the MSC as herein described is intended to be embraced. At least one MSC 42 in the PLMN 30, and more likely one MSC 42 in each mobile network 40 is connected via a gateway to the PSTN 20. Some MSCs 42 may also serve as gateways connecting the various mobile networks 40 within the PLMN 30. Gateway functions may be all consolidated at a single MSC 42 within a mobile network 40 or dispersed amongst a plurality of MSCs 42 within a mobile network 40 as needed or desired. At least one MSC 42 within a particular mobile network 40 may be communicatively connected to a Home Location Register (HLR) 44 and a Visitor Location Register (VLR) 46. Additionally, each mobile network 40 may be equipped with a message center 48 communicatively connected to an MSC 42. Each MSC 42 may further be communicatively connected to a plurality of base stations 50. An MSC 42 responsible for a LWTS 60 may treat the LWTS 60 as another base station 50 or a plurality of base stations 50 depending on the internal structure of the LWTS 60 in question. Each base station 50 may be communicatively connected to one or more mobile terminals 100, typically over an RF communications channel.

The function of the MSCs 42 is to route calls and signals in the mobile network 40 to the appropriate destination. To perform this function, a mobile network 40 relies on the HLR 44 and the VLR 46. HLR 44 is used to store information concerning subscribers to a mobile network 40, e.g., AT&T's subscribers. This information typically includes the subscriber's name and address for billing purposes, the serial number of the subscriber's mobile terminal 100, and the services, which the subscriber is entitled to receive. In addition, the current coarse location of the subscriber, as evidenced by the current location of their mobile terminal 100, is stored in the HLR 44. Note that in this context the current coarse location is a very rough location determination, as in, the mobile terminal 100 is within this cell, which may be anywhere from 300 m to 35 km in diameter.

The current coarse location of the subscriber is secured when the mobile terminal 100 is powered on and at periodic intervals thereafter. In particular, the mobile terminal 100 registers through the nearest base station 50 with an MSC 42. This is referred to herein as the "serving MSC." The serving MSC 42 then sends information to the HLR 44 indicating in which cell of the mobile network 40 the mobile terminal 100 may be found. This assumes that the subscriber is in his home network—i.e., the one in which he has a service contract.

Mobile terminal 100 also registers through the nearest base station 50 and hence with an MSC 42 when it travels between two different service areas (areas served by different MSCs 42). As part of this registration procedure, the mobile terminal 100 transmits its Mobile Identification Number (MIN) to the closest base station 50, which in turn passes the information to the appropriate MSC 42. MSC 42 uses the MIN to determine which HLR 44 to access. When the mobile terminal 100 registers with the new MSC 42, the new servicing MSC 42 updates the HLR 44 with the current coarse location of the mobile terminal 100. When an MSC 42 receives a call addressed to a subscriber that is not currently in that MSC's service area, the MSC 42 will query the HLR 44 for the subscriber's current coarse location so that the call can be forwarded to the MSC 42 currently serving the subscriber.

VLR 46 is used to store information about subscribers of mobile terminals 100 that are not in their home network. When subscribers roam outside of their home network, the VLR 46 in the mobile network 40 being visited tracks the subscriber's location and verifies the Mobile Identification Number (MIN) of the mobile terminal 100. The VLR 46 in the network being visited queries the HLR 44 in the subscriber's home service area to authenticate the subscriber and determine the services to which the subscriber is entitled. Information concerning the subscriber is stored in the VLR 46 as long as the subscriber remains registered in the visited network. VLR 46 also stores the current coarse location of the subscriber. The subscriber's current coarse location is communicated back to the home network HLR 44 so that the home mobile network 40 will know where to forward a call addressed to the subscriber who is currently outside the home mobile network 40.

Together, the HLR 44 and the VLR 46 provide the information needed by the MSCs 42 to route calls to the appropriate destination. The routing may further be accomplished by handing the call to another mobile network 40, locating the appropriate base station 50, or passing the call to the PSTN 20 as is appropriate. The exact protocols and communication regimens between the various entities in a mobile network 40 are well documented, such as in TIA/EIA-136, previously incorporated by reference.

Many mobile networks 40 implement a service called short message service (SMS). This service allows subscribers to send and receive short text messages. Messages originating from, or terminating at, a mobile terminal 100 in the network 40 are stored in the message center 48 connected to an MSC 42. Message centers 48 are well understood in the art and a further discussion is omitted.

LWTS 60 may be public or proprietary as needed or desired, and is typically a private network installed in a building or on a campus. LWTS 60 allows employees or other persons working in the building or on the campus to use a mobile terminal 100 as an office telephone. LWTS 60 connects with an MSC 42 in the PLMN 30. Thus, subscribers of the LWTS 60 may move seamlessly between the PLMN 30 and the LWTS 60. LWTS 60 may include a control and radio interface (not shown) and a plurality of transceiver stations.

Figure 2:
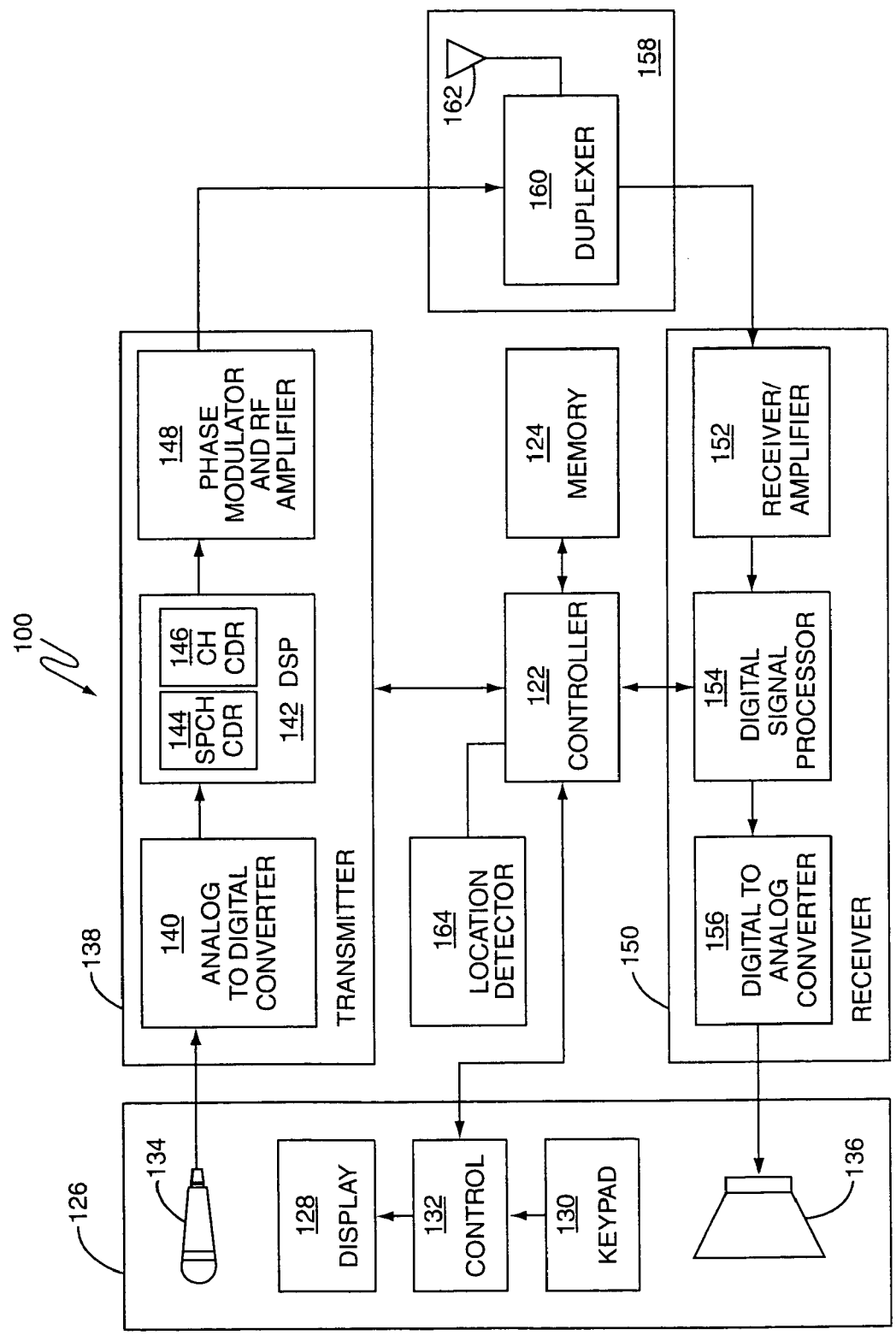
FIG. 2 illustrates a schematic drawing of a mobile terminal for use in the communication system of FIG. 1.

Turning now to FIG. 2, a mobile terminal 100 typically includes a controller 122, an operator interface 126, a transmitter 138, a receiver 150, and an antenna assembly 158. Operator interface 126 typically includes a display 128, keypad 130, interface control 132, microphone 134, and a speaker 136. Display 128 allows the operator to see dialed digits, call status, and other service information. Keypad 130 allows the operator to dial numbers, enter commands, and select options. Interface control 132 interfaces the display 128 and keypad 130 with the controller 122. Microphone 134 receives acoustic signals from the user and converts the acoustic signals to an analog electrical signal. Speaker 136 converts analog electrical signals from the receiver 150 to acoustic signals that can be heard by the user.

The analog electrical signal from the microphone 134 is supplied to the transmitter 138. Transmitter 138 includes an analog to digital converter 140, a digital signal processor 142, and a phase modulator and RF amplifier 148. Analog to digital converter 140 changes the analog electrical signal from the microphone 134 into a digital signal. The digital signal is passed to the digital signal processor (DSP) 142, which contains a speech coder 144 and channel coder 146. Speech coder 144 compresses the digital signal and the channel coder 146 inserts error detection, error correction and signaling information. DSP 142 may include, or may work in conjunction with, a DTMF tone generator (not shown). The compressed and encoded signal from the digital signal processor 142 is passed to the phase modulator and RF amplifier 148, which are shown as a combined unit in FIG. 2. The modulator converts the signal to a form that is suitable for transmission on an RF carrier. RF amplifier 148 then boosts the output of the modulator for transmission via the antenna assembly 158.

Receiver 150 includes a receiver/amplifier 152, digital signal processor 154, and a digital to analog converter 156. Signals received by the antenna assembly 158 are passed to the receiver/amplifier 152, which shifts the frequency spectrum, and boosts the low-level RF signal to a level appropriate for input to the digital signal processor 154.

Digital signal processor 154 typically includes an equalizer to compensate for phase and amplitude distortions in the channel corrupted signal, a demodulator for extracting bit sequences from the received signal, and a detector for determining transmitted bits based on the extracted sequences. A channel decoder detects and corrects channel errors in the received signal. The channel decoder also includes logic for separating control and signaling data from speech data. Control and signaling data are passed to the controller 122. Speech data is processed by a speech decoder and passed to the digital to analog converter 156. Digital signal processor 154, may include, or may work in conjunction with, a DTMF tone detector (not shown). Digital to analog converter 156 converts the speech data into an analog signal that is applied to the speaker 136 to generate acoustic signals that can be heard by the user.

Antenna assembly 158 is connected to the RF amplifier of the transmitter 138 and to the receiver/amplifier 152 of the receiver 150. Antenna assembly 158 typically includes a duplexer 160 and an antenna 162. Duplexer 160 permits full duplex communications over the antenna 162.

Controller 122 coordinates the operation of the transmitter 138 and the receiver 150, and may for instance take the form of a typical microprocessor. This microprocessor may be a dedicated or shared microprocessor and may be a single processor or multiple parallel processors as needed or desired. This coordination includes power control, channel selection, timing, as well as a host of other functions known in the art. Controller 122 inserts signaling messages into the transmitted signals and extracts signaling messages from the received signals. Controller 122 responds to any base station commands contained in the signaling messages, and implements those commands. When the user enters commands via the keypad 130, the commands are transferred to the controller 122 for action. Memory 124 stores and supplies information at the direction of the controller 122 and preferably includes both volatile and non-volatile portions.

In addition to the above-described elements, the mobile terminal 100 may also include a location detector 164 in communication with the controller 122. Location detector 164 may have its own antenna (not shown) or may share antenna 162. Location detector 164 may be a Global Positioning System (GPS), an Time Difference Of Arrival (TDOA—where the mobile terminal 100 computes position using observed timing of bursts from multiple base stations 50), a Time of Arrival system (TOA—where the mobile network 40 computes position using mobile terminal 100 bursts observed by multiple base stations 50), or other satellite or terrestrial system as needed or desired. It should be appreciated that while presently TDOA has been characterized as a downlink solution and TOA as an uplink solution, both may be implemented as uplink or downlink solutions as needed or desired. Typically, the location detector 164 will output a geocoordinate expressed as a longitude, latitude, and, optionally, altitude coordinates corresponding to the present location of the mobile terminal 100. In contrast to the coarse location determination made by the mobile network 40, a geocoordinate may, with present civilian systems, be accurate to within approximately five to two hundred meters.

It should be appreciated that the term mobile terminal may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, and/or calendar; and a conventional laptop and/or palmtop receiver or other appliance that includes a radiotelephone transceiver. Mobile terminals may also be referred to as "pervasive computing" devices. Thus, while the present discussion may be couched in terms of a phone, the present invention is equally applicable to these other sorts of devices. The previous discussion was by way of example, and not intended to be limiting on the definition of a mobile terminal.

Figure 3:
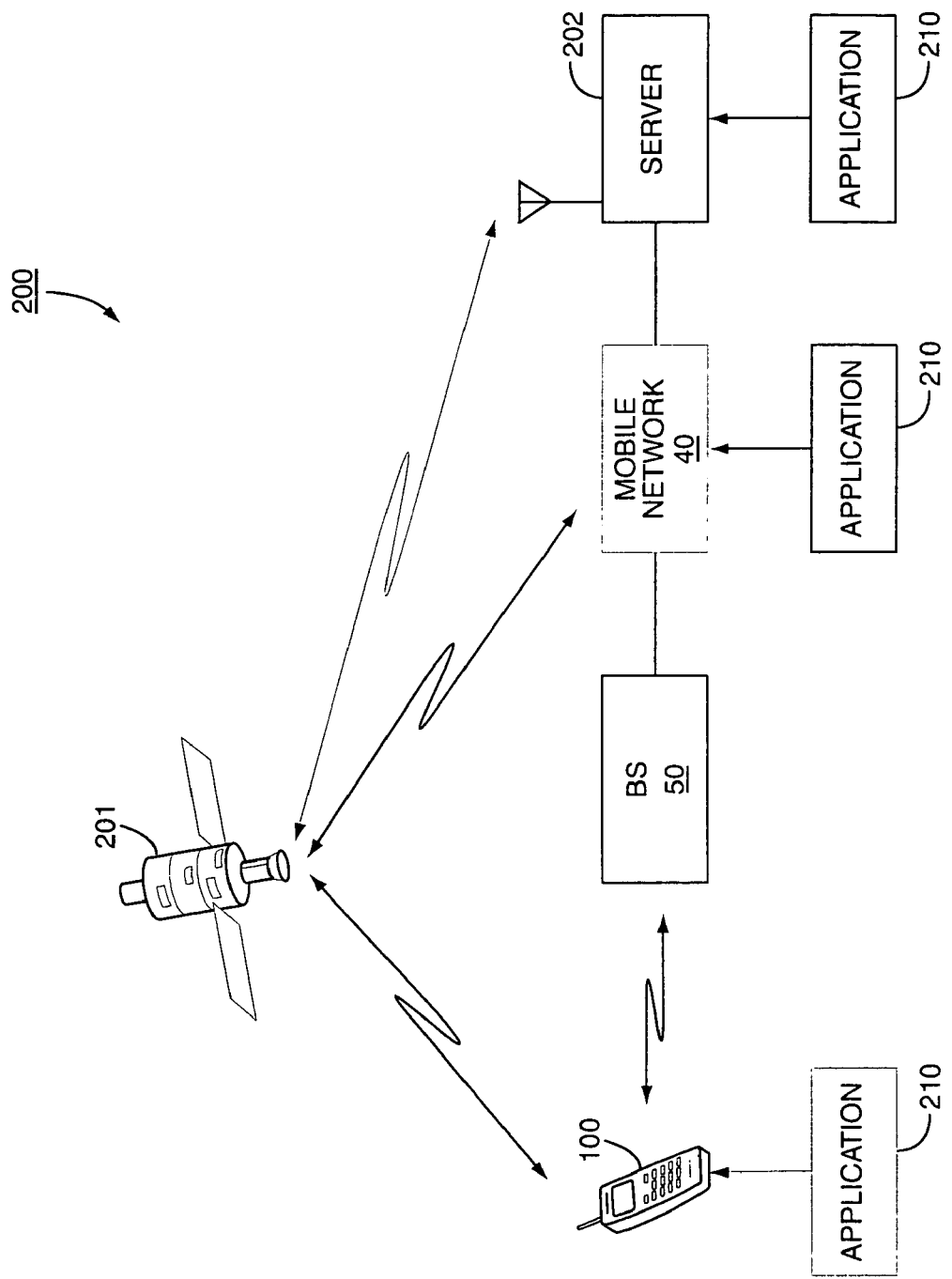
FIG. 3 illustrates a schematic drawing of a communication system wedded to a first position detection system.
Figure 4:
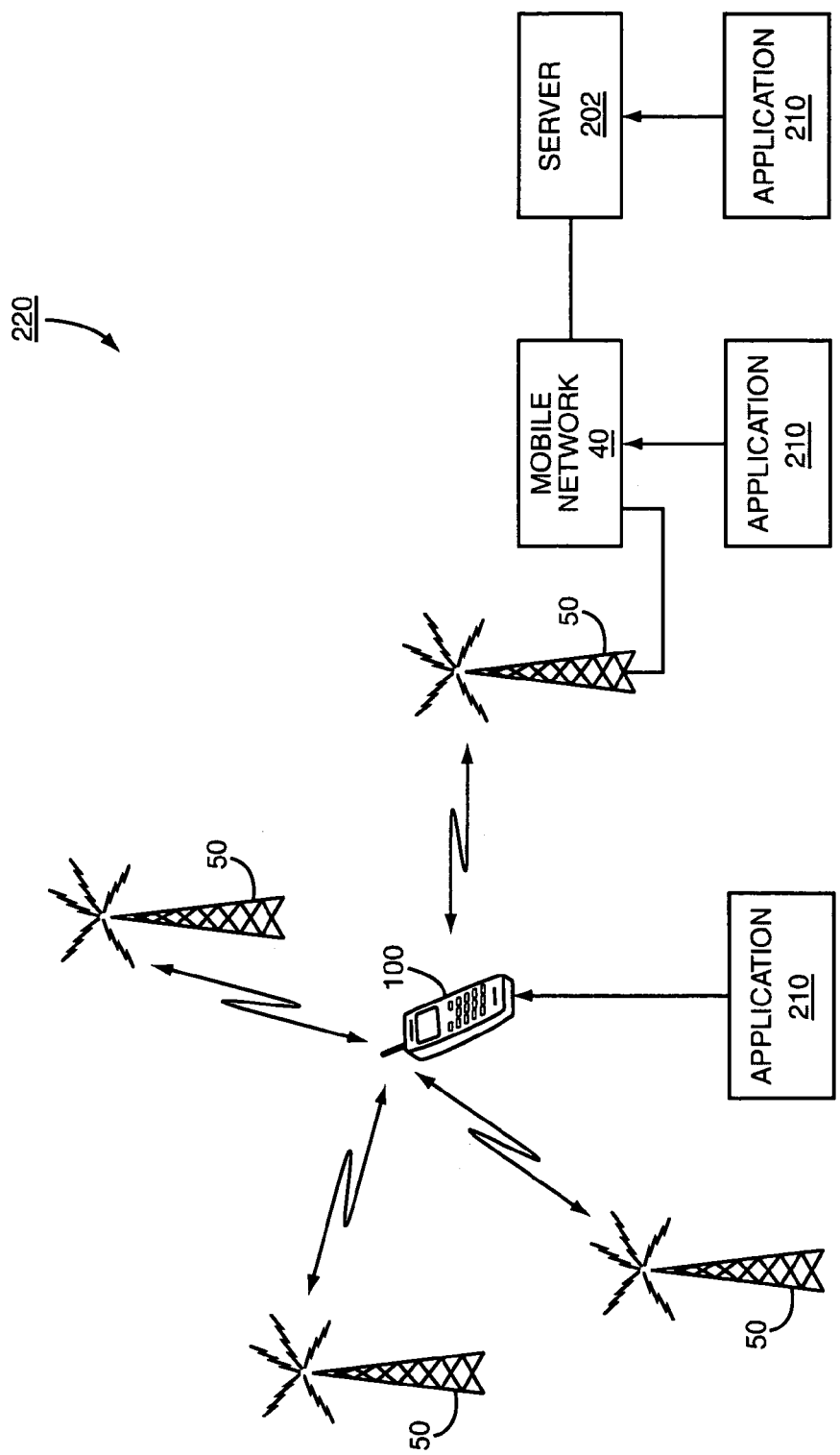
FIG. 4 illustrates a schematic drawing of a communication system wedded to a second position detection system.

With that discussion of mobile networks 40 and mobile terminals 100, it is now possible to discuss using a mobile terminal 100 with a position detection system 200 or 220. Exemplary position detection systems 200, 220 are shown in FIGS. 3 and 4. In particular, a satellite based position detection system 200, such as GPS or GLONASS, is illustrated in FIG. 3. Satellite based position detection system 200 employs a constellation of satellites 201 (only one shown) that orbit the earth in known trajectories. Applications 210 may be run at a number of positions that require location information from the position detection system 200.

In a first embodiment, an application 210 may run on the mobile terminal 100. An example of such an application would be a simple location program that tells the user of the mobile terminal 100 where the mobile terminal 100 is located. In a second embodiment, an MSC 42 (FIG. 1) within the mobile network 40 may have an application 210 running thereon that solicits information about the whereabouts of a particular mobile terminal 100. This may be for emergency purposes, billing purposes, or some other reason. In a third embodiment, a server 202 external to the mobile network 40 may have an application 210 that inquires as to the whereabouts of a particular mobile terminal 100. Examples of such usages include delivery services inquiring where their drivers are located as evidenced by the location of the drivers' mobile terminals 100. Server 202 interfaces with the mobile network 40 through conventional means and instructs the mobile terminal 100 to report its present location. Note that server 202 may also be in communication with the position detection system 200 and be adapted to receive almanac and ephemeris information therefrom routinely.

An alternate, terrestrial position detection system 220 is illustrated in FIG. 4. In particular, a mobile terminal 100 uses TDOA, TOA, or other such methodology to determine its position. Again, applications 210 may be operating at one or more locations and periodically need information about the present location of a particular mobile terminal 100. It should be appreciated that the position detection system may be a hybrid of satellite and terrestrial position detection assisting devices. The present invention is well suited for all three situations, terrestrial, satellite, and hybrid.

For the purposes of the present invention, the term "position detection assisting devices" is defined as including satellites, such as a GPS satellite 201, base stations 50 in an TDOA or TOA system, and other devices that enable the location detector 164 to determine the present location of the mobile terminal 100.

Regardless of the reason that application 210 wishes to know the location of the mobile terminal 100, the fact remains that an application 210 has made an inquiry as to the location of the mobile terminal 100. In the prior art, in the context of a GPS, the mobile terminal 100 would have to either download from the satellite 201 almanac and/or ephemeris information. This may take approximately twelve and a half minutes. Alternatively in the prior art, the mobile terminal 100 would inquire over the mobile network 40 and retrieve almanac and/or ephemeris information from the mobile network 40 or the server 202. This information would then be broadcast over the mobile network 40, consuming bandwidth and making the jobs of network administrators more difficult. For example, such ephemeris information may be broadcast on the BATS service of the DCCH channel in a TIA/EIA-136 based mobile network 40 and over the CBCH or BCCH in a GSM based mobile network 40. While providing ephemeris in individual responses to requests from different mobile terminals 100 alleviates this problem, it is relatively inefficient from a network management point of view. Moreover, when the number of mobile terminals requesting ephemeris data increases, the problem of using bandwidth, another scarce resource, is not alleviated. Such might clog the SDCCH channel in a GSM system. It should be appreciated that mobile network 40 and server 202 as fixed installations may continually monitor the ephemeris information, and always have readily available ephemeris information for downloading to the mobile terminal 100 through the base station 50.

Figure 5:
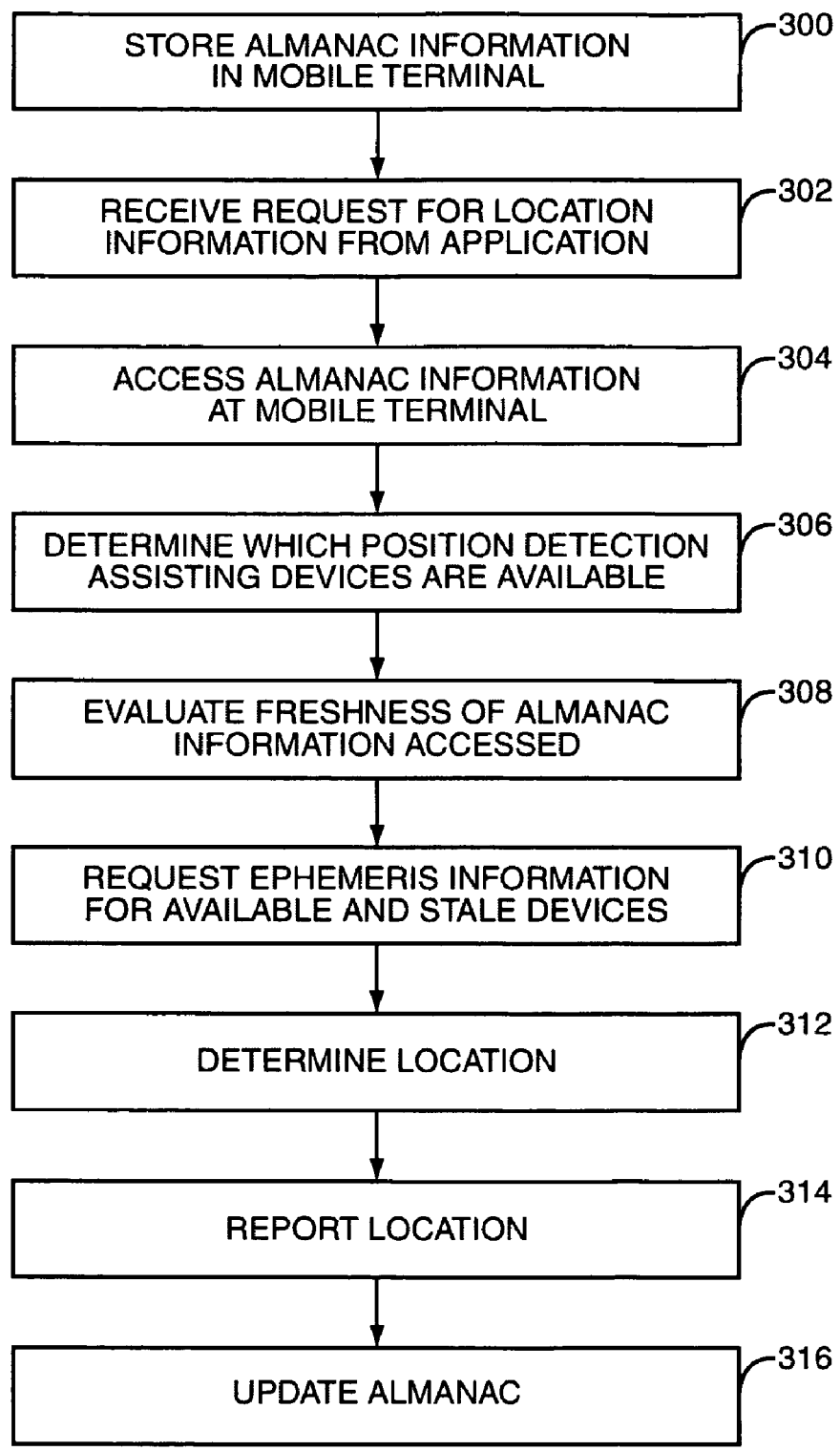
FIG. 5 illustrates as a flow chart the methodology of one embodiment of the present invention.

Exemplary methodology of one embodiment of the present invention is illustrated in flow chart form in FIG. 5. Initially, almanac information, which may be valid for up to six months or more, is stored in memory 124 of the mobile terminal 100 (block 300). Mobile terminal 100 may periodically receive information about its present coarse location. This information may be broadcast by the mobile network 40, reported to the mobile terminal 100 upon inquiry by the mobile terminal 100, or some other mechanism. For example, this location information may be stored from a previous location determination or the mobile terminal 100 may have a database with cell identification codes correlated to a position.

Upon receipt of a request for location from the application 210 (block 302), the mobile terminal 100 accesses memory 124 and particularly the almanac information stored in memory 124 (block 304). It is possible that the mobile terminal 100 may have ephemeris information stored in memory 124. Should such ephemeris information be available, the mobile terminal 100 may alternatively access the ephemeris information. Mobile terminal 100 then determines which subset of the position detection assisting devices should be visible from the entirety of the position detection system from which to determine location (block 306). This visibility determination can be made because the mobile terminal 100 knows a coarse location and a time. The time may be provided by an internal clock or from the mobile network 40 as needed or desired. Additionally, the mobile terminal 100 may receive doppler and code phase information from the mobile network 40. Armed with the location and time, the mobile terminal 100 may determine which position detection assisting devices are in theory visible to the antenna of the mobile terminal 100. Thus, for example, if only six of the twenty-eight GPS satellites 201 are above the horizon at this time of the day in this coarse location, only those six would be "visible." The same is true of base stations 50. Only certain base stations 50 may be "visible" to the mobile terminal 100 depending on coarse location of the mobile terminal 100. Mobile terminal 100 then evaluates the freshness of the information in the almanac or ephemeris that has been accessed (block 308). Evaluating a time stamp and comparing it to a certain threshold may do this. In particular, ephemeris information is typically valid for approximately four hours. Thus, if the time stamp is less than four hours old, the ephemeris may be considered fresh. It is certainly possible to create other tolerances of freshness as needed or desired.

Mobile terminal 100 then requests from either the server 202 or the mobile network 40 contemporary or ephemeris information relating only to those position detection assisting devices that are visible (block 310) as indicated by the earlier determination and that are stale. Note that contemporary information may be requested for all visible devices regardless of freshness. In an alternate embodiment, if more position detection assisting devices are visible than required to make an accurate position determination, then the mobile terminal 100 may further refine the subset to include only a necessary and sufficient number of position detection assisting devices. For example, if seven satellites are visible, and only four are required to determine the location of the mobile terminal 100, then ephemeris is only requested for four of the seven. This further saves bandwidth demands on the mobile network 40.

Mobile terminal 100 then determines its location (block 312) by using the visible position detection assisting devices. Mobile terminal 100 may report its position to the application 210 that originally requested the information (block 314).

Mobile terminal 100 may optionally update information in the almanac stored in memory 124 with the most recently downloaded ephemeris information (block 316). This update may actually update ephemeris information in the mobile terminal, or be translated to almanac information as suggested in commonly assigned application serial number entitled POSITION DETECTION SYSTEM INTEGRATED INTO MOBILE TERMINAL, Ser. No. 09/657, 367 filed 7 Sep. 2000 by David McMahon, which is herein incorporated by reference in its entirety. Note that while some events must take place before others, the precise order of events is intended to be exemplary and variations in the order in which the steps are performed still fall within the scope of the present invention.

Note that the ability to request information about position detection assisting devices has been built into the SAMPS (System Assisted Mobile Positioning by Satellite) protocol for TIA/EIA-136 rev. C. This saves traffic on the mobile network 40. Further, if consumers are billed on how much bandwidth or how many packets they receive, the present invention may reduce costs to the consumer by minimizing the amount of information that is requested and received by the mobile terminal 100.

Figure 6:
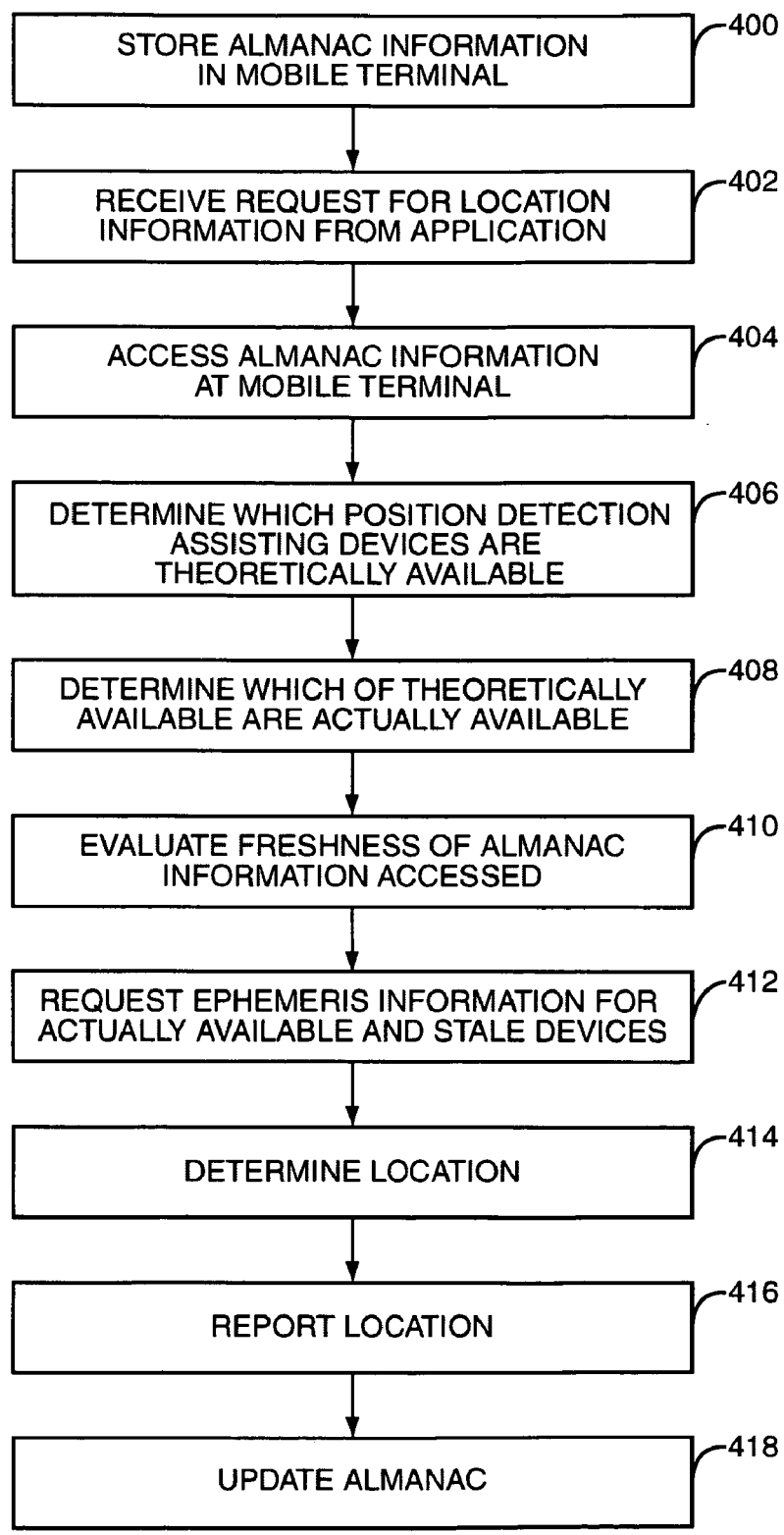
FIG. 6 illustrates as a flow chart the methodology of a second embodiment of the present invention.

Exemplary methodology of a second embodiment of the present invention is illustrated in flow chart form in FIG. 6. Initially, almanac information, which may be valid for up to six months or more, is stored in memory 124 of the mobile terminal 100 (block 400). It may be possible that the mobile terminal 100 has ephemeris information stored in memory 124. Mobile terminal 100 may periodically receive information about its present coarse location. This information may be broadcast by the mobile network 40, reported to the mobile terminal 100 upon inquiry by the mobile terminal 100, or some other mechanism. For example, this location information may be stored from a previous location determination or the mobile terminal 100 may have a database with cell identification codes correlated to a position.

Upon receipt of a request for location from the application 210 (block 402), the mobile terminal 100 accesses memory 124 and particularly the almanac or ephemeris information stored in memory 124 (block 404). Mobile terminal 100 then determines which subset of the position detection assisting devices should be visible from the entirety of the position detection system from which to determine location (block 406). This visibility determination can be made because the mobile terminal 100 knows a coarse location and a time. The time may be provided by an internal clock or from the mobile network 40 as needed or desired. Additionally, the mobile network 40 may provide doppler and code phase information as needed or desired. Armed with the location and time, the mobile terminal 100 may determine which position detection assisting devices are in theory visible to the antenna of the mobile terminal 100. Thus, for example, if only six of the twenty-eight GPS satellites 201 are above the horizon at this time of the day in this coarse location, only those six should be "visible." The same is true of base stations 50. Only certain base stations 50 may be "visible" to the mobile terminal 100 depending on coarse location of the mobile terminal 100.

Mobile terminal 100 may then evaluate which of the theoretically visible position assisting devices are actually visible (block 408). This may be done by receiving signals. Thus, nulls, urban canyons, mountainous regions, or other impediments to reception are evaluated.

Mobile terminal 100 then evaluates the freshness of the information in the almanac or ephemeris that has been accessed (block 410). Evaluating a time stamp and comparing it to a certain threshold may do this. In particular, ephemeris information is typically valid for approximately four hours. Thus, if the time stamp is less than four hours old, the ephemeris may be considered fresh. It is certainly possible to create other tolerances of freshness as needed or desired.

Mobile terminal 100 then requests from either the server 202 or the mobile network 40 contemporary or ephemeris information relating only to those position detection assisting devices that are actually visible (block 412) as indicated by the earlier determination and that are stale. Note that contemporary information may be requested for all visible devices regardless of freshness. In an alternate embodiment, if more position detection assisting devices are visible than required to make an accurate position determination, then the mobile terminal 100 may further refine the subset to include only a necessary and sufficient number of position detection assisting devices. For example, if seven satellites are visible, and only four are required to determine the location of the mobile terminal 100, then ephemeris is only requested for four of the seven. This further saves bandwidth demands on the mobile network 40.

Mobile terminal 100 then determines its location (block 414) by using the visible position detection assisting devices. Mobile terminal 100 may report its position to the application 210 that originally requested the information (block 416).

Mobile terminal 100 may optionally update information in the almanac stored in memory 124 with the most recently downloaded ephemeris information (block 418). This update may actually update ephemeris information in the mobile terminal, or be translated to almanac information as suggested in commonly assigned application Ser. No. 09/660, 519, entitled POSITION DETECTION SYSTEM INTEGRATED INTO MOBILE TERMINAL, concurrently filed, by David McMahon, previously incorporated. Note that while some events must take place before others, the precise order of events is intended to be exemplary and variations in the order in which the steps are performed still fall within the scope of the present invention.

Note that another variant of the present invention is that the mobile terminal 100 generates the request for the ephemeris midway through the position detection assistance device signal acquisition process so as to not delay total time for computing the position. The signal strength from the position detection assistance devices may be known even before accurate acquisition of the devices is complete.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of facilitating location detection, comprising:
storing information relating to position detection assisting devices in a mobile terminal;
referencing said information to determine, by said mobile terminal, a subset of the position detection assisting devices which are available from which to determine location, wherein referencing said information to determine a subset of the position detection assisting devices which are available comprises determining, by said mobile terminal, a subset consisting of only the position detection assisting devices necessary and sufficient from which to determine location;
requesting contemporary information about said subset from a mobile network; and
after said determining by said mobile terminal, beginning acquisition of position location assistance signals from said subset of the position detection devices.

2. The method of claim 1 further comprising receiving an inquiry as to the present location of the mobile terminal.

3. The method of claim 2 wherein receiving an inquiry as to the present location of the mobile terminal originates in the mobile terminal.

4. The method of claim 2 wherein receiving an inquiry as to the present location of the mobile terminal originates in a mobile network associated with the mobile terminal.

5. The method of claim 2 wherein receiving an inquiry as to the present location of the mobile terminal originates in a server communicatively connected to a mobile network associated with the mobile terminal.

6. The method of claim 1 wherein requesting contemporary information about said subset from a mobile network comprises evaluating a time stamp to determine whether the mobile terminal already has contemporary information about one or more position detection assisting devices in said subset.

7. The method of claim 6 wherein requesting contemporary information comprises requesting contemporary information about only those in said subset about whom contemporary information is not available in the mobile terminal.

8. The method of claim 6 wherein evaluating a time stamp comprises evaluating a time stamp to determine if said time stamp falls within a predetermined threshold.

9. The method of claim 8 wherein evaluating a time stamp to determine if said time stamp falls within a predetermined threshold comprises evaluating if said time stamp is more than four hours old.

10. The method of claim 1 wherein requesting contemporary information about said subset from a mobile network comprises requesting contemporary information from a server within the mobile network.

11. The method of claim 1 wherein requesting contemporary information about said subset from a mobile network comprises requesting contemporary information from a server communicatively connected to said mobile network.

12. The method of claim 1 further comprising receiving the contemporary information at the mobile terminal and subsequently locating said mobile terminal based on information received from said subset of position detection assisting devices.

13. The method of claim 12 further comprising reporting the location of the mobile terminal as determined by said locating step.

14. The method of claim 1 wherein said requesting contemporary information occurs prior to said beginning acquisition of position location assistance signals from said subset of the position detection devices.

15. A mobile terminal comprising:
a transceiver;
a control system operatively connected to said transceiver, wherein said control system stores information relating to a plurality of position detection assisting devices within a position detection system and solicits contemporary information from a mobile network via said transceiver relating to a subset of said position detection assisting devices; and
wherein said control system further determines, at said mobile terminal, a subset of the position detection assisting devices which are available from which to determine location based on said information, said subset consisting of only the position detection assisting devices necessary and sufficient from which to determine location, and wherein said control system thereafter causes acquisition of position assisting signals from said subset to be initiated.

16. The mobile terminal of claim 15 wherein said control system determines a present location of the mobile terminal after soliciting said contemporary information.

17. The mobile terminal of claim 15 wherein information relating to a plurality of position detection assisting devices comprises information about a satellite-based position detection system.

18. The mobile terminal of claim 17 wherein said information comprises information relating to a plurality of satellites within a GPS.

19. The mobile terminal of claim 15 wherein said information relating to a plurality of position detection assisting devices comprises information about a terrestrial position detection system.

20. The mobile terminal of claim 15 wherein said information relating to a plurality of position detection assisting devices comprises information relating to a mixed satellite based and terrestrial position detection system.

21. A communication system comprising:
a server comprising contemporary information relating to a position detection system;
a mobile network;
a mobile terminal communicatively connected to said server through said mobile network, said mobile terminal storing local information relating to the position detection system and soliciting a subset of said contemporary information from said server based in part on said local information; and
wherein said mobile terminal determines a subset of the position detection assisting devices which are available from which to determine location based on said local information, said subset consisting of only the position detection assisting devices necessary and sufficient from which to determine location; and wherein said mobile terminal thereafter initiates acquisition of position assisting signals from said subset.

22. The communication system of claim 21 wherein said local information comprises an almanac.

23. The communication system of claim 21 wherein said contemporary information comprises satellite ephemeris.

24. The communication system of claim 21 wherein said mobile terminal determines a number of available position detection assisting devices within the position detection system based on a coarse location of the mobile terminal.

25. The communication system of claim 21 wherein said server forms a part of said mobile network.

26. The communication system of claim 21 wherein said server is communicatively connected to said mobile network.

27. A method of facilitating location detection, comprising:

storing information relating to position detection assisting devices in a mobile terminal;

referencing said information to determine, at said mobile terminal, a subset of the position detection assisting devices which are theoretically visible from which to determine location, wherein referencing said information to determine a subset of the position detection assisting devices which are available comprises determining, by said mobile terminal, a subset consisting of only the position detection assisting devices necessary and sufficient from which to determine location;

after said determining at said mobile terminal, beginning acquisition of position location assistance signals from said subset of the position detection devices;

receiving signals from position detection assisting devices which are actually visible to the mobile terminal; and requesting contemporary information about the position detection assisting devices which are actually visible from a mobile network.

28. A method of facilitating location detection using a satellite based positioning system, comprising:

evaluating an almanac within a mobile terminal to determine which satellites are theoretically available based on a coarse location and time of the mobile terminal;

securing at the mobile terminal, from a mobile network accurate time information for satellites that are theoretically available;

deriving, at the mobile terminal, doppler and code phase information for the satellites that are theoretically available;

thereafter, acquiring a signal from one or more of the satellites that are theoretically available and, based thereon, determining at the mobile terminal which of said one or more satellites from which signals are acquired from a subset of the theoretically available satellites consisting of only the satellites necessary and sufficient from which to determine location; and requesting ephemeris information only for those satellites in said subset.

29. The method of claim 28 wherein requesting ephemeris information comprises requesting ephemeris information for only those satellites whose previously stored ephemeris information is stale.

30. The method of claim 28 wherein acquiring a signal comprises evaluating a signal quality measurement.

* * * * *